United States Patent [19]

Lyons

[11] Patent Number: 5,389,045
[45] Date of Patent: Feb. 14, 1995

[54] CONVEYOR BELT TENSIONING MECHANISM

[75] Inventor: Scott F. Lyons, Shippensburg, Pa.

[73] Assignee: Ingersoll-Rand Company, Woodcliff Lake, N.J.

[21] Appl. No.: 174,500

[22] Filed: Dec. 28, 1993

[51] Int. Cl.⁶ .............................................. F16H 7/00
[52] U.S. Cl. ...................................................... 474/113
[58] Field of Search ........................ 474/101, 113–117, 474/111; 198/804, 813, 814, 816, 832.1

[56] References Cited

U.S. PATENT DOCUMENTS

| | | |
|---|---|---|
| 2,564,090 | 8/1951 | Ziemann . |
| 2,677,456 | 5/1954 | McCann . |
| 2,702,485 | 2/1955 | Nadherny . |
| 2,753,039 | 7/1956 | Velten et al. . |
| 2,759,594 | 8/1956 | Kleboe et al. . |
| 3,414,115 | 12/1968 | Gates et al. . |
| 3,718,197 | 2/1973 | Barten et al. . |
| 4,185,908 | 1/1980 | Taylor et al. . |
| 4,253,343 | 3/1981 | Black et al. . |
| 4,372,440 | 2/1983 | Ringis ...................... 474/113 X |
| 4,553,664 | 11/1985 | Buschbom et al. . |
| 4,803,804 | 2/1989 | Bryant . |
| 4,995,506 | 2/1991 | Langenbacher et al. . |
| 5,174,435 | 12/1992 | Dorner et al. . |

*Primary Examiner*—Michael Powell Buiz
*Attorney, Agent, or Firm*—John J. Selko

[57] ABSTRACT

A conveyor belt tensioning mechanism includes a frame assembly, a conveyor belt movable around a head and end pulley on the frame assembly, one of the pulleys being longitudinally movable along the frame assembly, a first adjustment member on the frame assembly for moving one end of the movable pulley longitudinally, to apply tension force to the belt, a second adjustment member on the frame assembly for moving the other end of the movable pulley longitudinally, to apply tension force to the belt, each adjustment member having an indicating member thereon, for indicating when tension force on the belt is within a preselected tension force range.

7 Claims, 3 Drawing Sheets

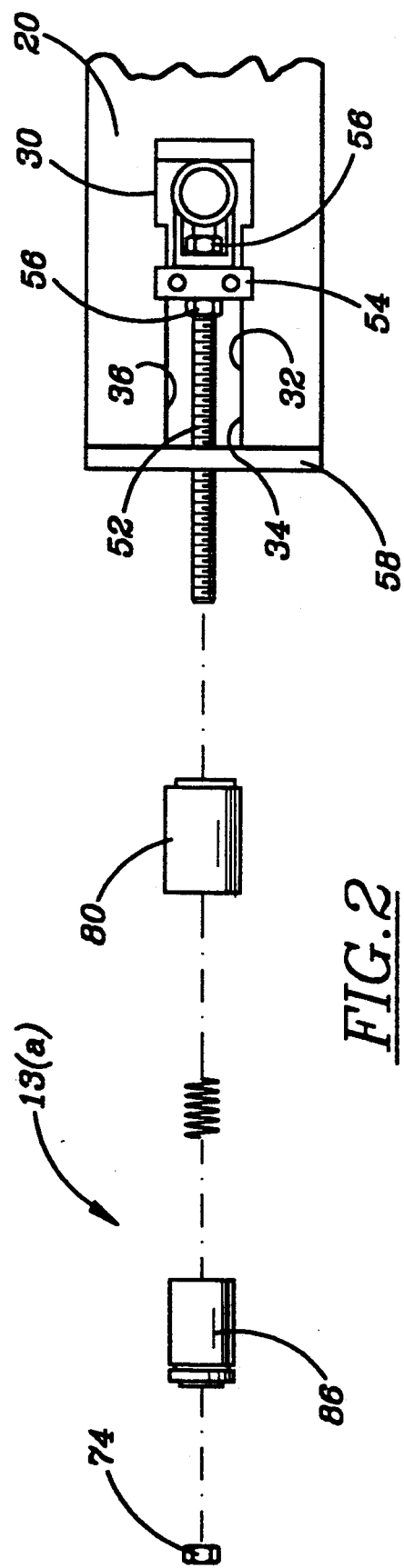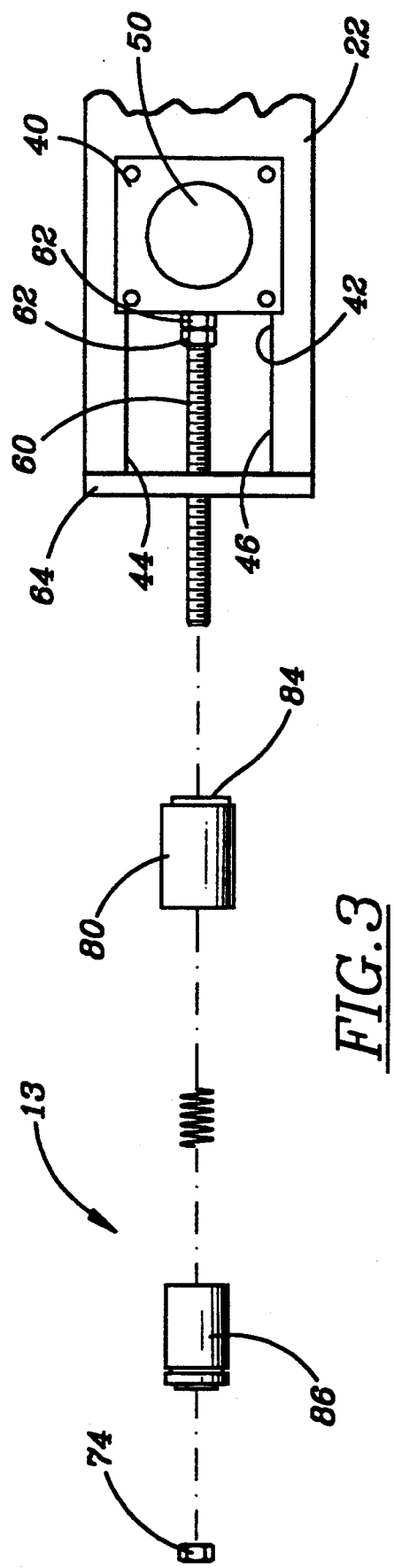

CONVEYOR BELT TENSIONING MECHANISM

BACKGROUND OF THE INVENTION

This invention relates generally to conveyor belt assemblies and more particularly to a tensioning mechanism for controlling the tension of a conveyor belt for a road milling machine.

It is necessary to provide a conveyor belt tensioning system that will give the operator a readable indication of tensioning force. Tensioning belts by "feel" is not an accurate procedure, and can lead to belt slippage in the under-tensioned case and to premature failure of the belt, or failure of the bearing and pulley that support the belt, in the over-tensioned case. Improperly tensioned belts can also result in poor tracking.

The foregoing illustrates limitations known to exist in present conveyor belt tensioning systems. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a conveyor belt tensioning mechanism comprising: a frame assembly extending longitudinally with respect to a longitudinal axis; a head end pulley at one end of the frame assembly; a tail end pulley at an opposite end of the frame assembly; an endless conveyor belt movable over the end pulleys; means for mounting at least one of the end pulleys on the frame assembly for longitudinal movement therealong; adjustment means on the frame assembly for moving the movable end pulley longitudinally, to apply tension force to the conveyor belt, for tightening the conveyor belt; and indicating means on the adjustment means, for indicating when tension force on the conveyor belt is within a preselected tension force range.

The foregoing and other aspects will become apparent from the following detailed description of the invention when considered in conjunction with the accompanying drawing figures.

BRIEF DESCRIPTION OF THE DRAWING FIGURES

FIG. 2 is an elevational, exploded view, with parts removed, of a side rail of a conveyor assembly having an adjustment and indicating means of the invention thereon;

FIG. 3 is a view similar to FIG. 2, showing a side rail having the invention combined with a mount for a hydraulic motor thereon.

DETAILED DESCRIPTION

Figure 1:
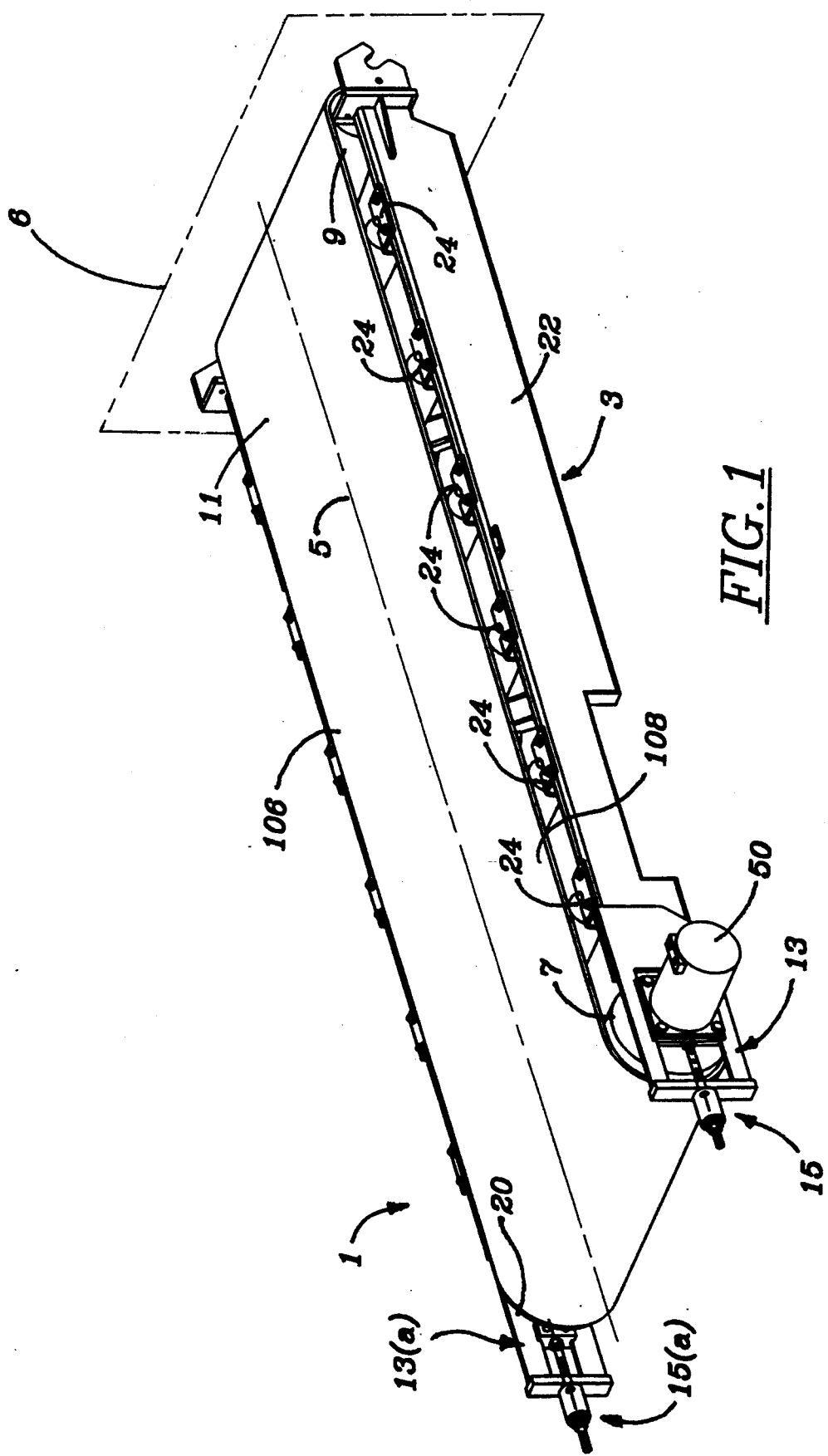
FIG. 1 is perspective view, with parts removed, of a conveyor belt assembly having the belt tensioning system of the invention thereon.

Now referring to FIG. 1, there is shown a conveyor 1, having a frame assembly 3 extending longitudinally with respect to a longitudinal axis of symmetry 5. A head pulley 7 is at one end of frame assembly 3. A tail pulley 9 is at an opposite end of frame assembly 3. An endless conveyor belt 11 is movable over head pulley 7 and tail pulley 9, as is well known. One of the pulleys, 7,9, preferably head pulley 7, is mounted on frame assembly 3 for longitudinal movement therealong.

Adjustment means, shown generally as 13 and 13(a), is mounted on frame assembly 3 for moving head pulley 7 longitudinally, to apply tension force to belt 11, for tightening belt 11. Indicating means, shown generally as 15 and 15(a), is incorporated with adjustment means 13, 13(a), for indicating when tension force on belt 11 is within a preselected tension force range.

Frame assembly 3 further comprises a first side rail member 20, a second side rail member 22 spaced therefrom, said first and second side rail members, 20,22 extending parallel to longitudinal axis 5. Conveyor 1 is connected to a milling machine 6, shown in phantom, by conventional means. A plurality of conveyor belt support rollers 24 extend between side rails 20,22.

Head pulley 7 is mounted for longitudinal movement along side rails 20,22. As shown in FIGS. 2 and 3, first bearing housing 30 is slidably mounted in a slot 32 at one end of side rail 20. Bearing 30 can be of any well-known material, and is formed with a slot along its length for receiving, in slidable engagement, top and bottom edges 34, 36 of slot 32 of side rail 20.

A second bearing 40 is slidably mounted in a slot 42 at one end of side rail 22, adjacent one end thereof. Bearing 40 can be of any well-known material, and is formed with a slot along its length for receiving, in slidable engagement, top and bottom edges 44,46 of slot 42 of side rail 22. Head pulley 7 is journaled for rotation in suitable bearing journals in bearings 30, 40.

One bearing 40 is preferred to include a mounting surface for mounting thereon, as by bolting, a hydraulic or electric motor 50, for the purpose of driving head pulley 7. The connection of the motor 50 to head pulley 7 is conventional and well known, and includes one end of the shaft of the pulley 7 (not shown) being a chuck member over a shaft on motor 50.

Also referring to FIGS. 2-4, the adjustment means 13(a), 13 and indicating means 15(a), 15 will be described. Both side rails 20,22 have mounted thereon an adjustment means 13(a), 13, respectively and an indicating means, 15(a), 15, respectively.

First adjustment means 13(a) includes a threaded shaft 52 having a first end fastened to a front member 54 of first bearing housing 30 by means of nuts 56. Second end of shaft 52 extends longitudinally outwardly beyond and end flange 58 on first side rail 20.

Likewise, second adjustment means 13 includes a threaded shaft 60 having a first end fastened to second bearing housing 40 by means of nuts 62, one of which is welded to bearing housing 40. A second end of shaft 60 extends longitudinally outwardly beyond an end flange 64 on second side rail 22.

Figure 4:
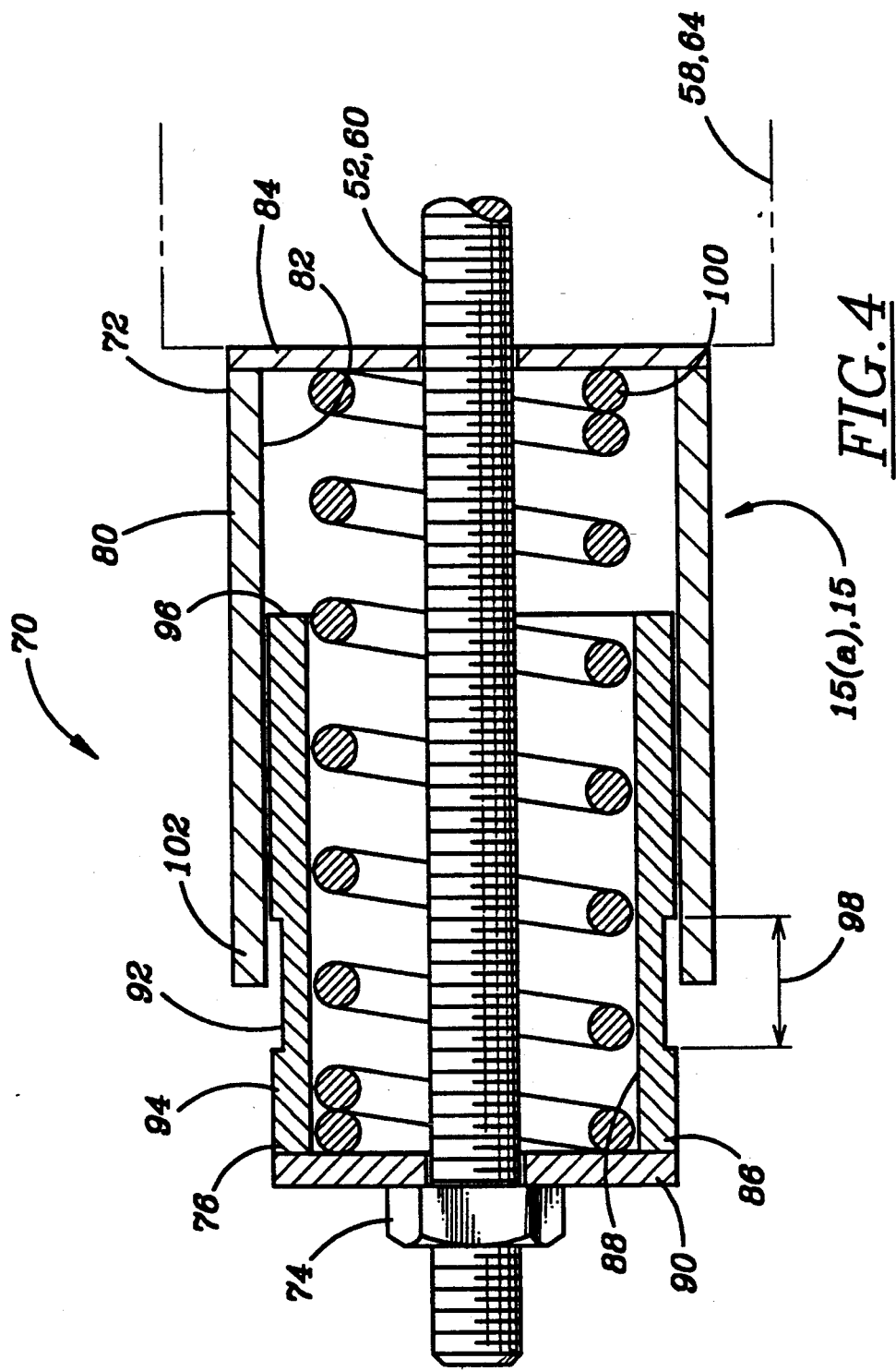
FIG. 4 is an enlarged, cross-sectional view, with parts removed, showing the assembled indicating means of the invention.

As shown in FIG. 4, first indicating means 15(a) has an elastically expandable and contractible body portion 70 telescoped on shaft 52 for elastic expansion and contraction movement therealong, with a first end 72 of body portion 70 contacting flange 58. Likewise, the contractible body could be rotated 180 degrees so that the opposite end 76 of body portion 70 could contact flange 58. An end nut 74 is adjustably threaded onto second end of shaft 52. Nut 74 contacts a second end 76 of body portion 70 to lock indicating means 15(a) onto side rail 20. It would be equivalent to reverse indicating means 15(a) 180 degrees, so that first end 72 contacts nut 74 and second end 76 contacts flange 58. Body portion 70 telescopically contracts indicating means 15(a) as end nut 74 is threaded onto shaft 52.

Second indicating means 15 is similar to first indicating means 15(a), and identical parts are given the same numbers herein for both indicator means 15(a) and 15. Second indicating means 15 has an elastically expandable and contractible body portion 70 telescoped on shaft 60 for elastic expansion and contraction movement therealong, with a first end 72 of body portion 70 contacting flange 64. An end nut 74 is adjustably threaded onto second end of shaft 60. Nut 74 contacts a second end 76 of body portion 70 to lock indicating means 15 onto side rail 20. It would be equivalent to reverse indicating means 15 180 degrees, so that first end 72 contacts nut 74 and second end 76 contacts flange 58. Body portion 70 telescopically contracts indicating means 15 as end nut 74 is threaded onto shaft 60.

FIG. 4 shows and expanded view of an assembled indicator means 15(a), 15. A first hollow, outer sleeve, tubular base member 80 having an internal surface forming a longitudinal bore 82 therein is telescoped on shaft 52,60. Base member 80 is faced with a plate member 84 fastened thereto, as by welding. Plate member 84 has an aperture therein for passage of shaft 52,60 therethrough.

A second hollow, inner sleeve, tubular top member 86 having an internal surface forming a longitudinal bore 88 is movably telescoped within base member bore 82 and telescoped on shaft 52,60. Top member 86 has an outer end that is faced with a plate member 90 fastened thereto, as by welding. Plate member 90 has an aperture therein for passage of shaft 52,60 therethrough.

Top member 86 has a circumferential groove 92 in outer surface 94. Because top member 84 is a cylindrical tube, groove 92 is annular. Other tubular shapes, such as square or triangle, will also work. Groove 92 is positioned intermediate between outer end 76 and inner end 96 of top member 86. Groove 92 has a pre-selected, critical width 98 extending longitudinally parallel to axis 5, for a purpose described hereinafter. Elastic spring means 100 is telescoped on shaft 52, 60 and positioned in bores 82, 88.

The compressive property of spring 100 is selected so that spring 100 provides a known outward force per inch of compression. It has been discovered that optimum belt tightening, wear and tracking occurs when the total tension force exerted on the belt 11 is just below the force that would elastically stretch the belt 11. It has been discovered that the optimum force is between 600 and 900 pounds, for a belt 11 having the following characteristics: endless conveyor belt, 1 meter wide, 278 inches long, 1 inch vanner ridge on each side, 45 degree bias splice for making belt endles, U cleats on 6 inch centers (AP-SA pattern), load capacity 220 lbs./inch.

It has also been discovered that with two adjustment means 13(a) and 13, the tension force exerted by each individual adjustment means is additive. Therefore to provide the required total tension force, spring 100 is selected for each adjustment means 13(a) and 13 to provide half of the required total tension force from each one. Because the belt 11 wears or stretches, it requires periodic tightening, but still within the desired tension range of 600–900 pounds. The width 98 of groove 92 is selected so that the end 102 of base member 80 must overlap groove 92, to indicate that the tension force is within the optimum tension range. This combination of spring characteristic and groove width is achieved by selecting a spring with a compressive factor of 1480 lbs./inch. Groove width 98 should be 0.200 inches.

In operation, after belt 11 is hand tensioned, each adjustment means 13(a), 13 is tightened by turning nut 74. Adjustment means 13(a) applies tension force to belt 11, but primarily acting along a longitudinal edge 106 of belt 11 that is closest to adjustment means 13(a). Adjustment means 13 applies tension force to belt 11, but primarily acting along a longitudinal edge 108 of belt 11 that is closest to adjustment means 13. As the belt stretches, or wears, and it becomes necessary to adjust tension, nut 74 is turned.

I have discovered that a belt tightened with the device of this invention exhibits about a 20 per cent increase in belt life. Wear and tear on the conveyor components such as bearings and motor are reduced as a result of not over-tensioning the belt.

Having described the invention, what is claimed is:

1. In a conveyor belt assembly, a conveyor belt tensioning mechanism comprising:
   a. a frame assembly extending longitudinally with respect to a longitudinal axis;
   b. a head end pulley at one end of said frame assembly;
   c. a tail end pulley at an opposite end of said frame assembly;
   d. an endless conveyor belt movable over said end pulleys;
   e. mounting means for mounting at least one of said end pulleys on said frame assembly for longitudinal movement therealong;
   f. adjustment means on said frame assembly for moving said movable end pulley longitudinally, to apply tension force to said conveyor belt, for tightening said conveyor belt;
   g. indicating means on said adjustment means, for indicating when tension force on said conveyor belt is within a preselected tension force range and
   h. driving means mounted on said mounting means for driving said end pulley.

2. The conveyor belt tensioning mechanism of claim 1 wherein said frame assembly further comprises:
   a. a first side rail member;
   b. a second side rail member spaced therefrom;
   c. said first and second side rail members extending parallel to said longitudinal axis; and
   d. a plurality of conveyor belt support rollers extending between said first and second side rails.

3. The conveyor belt tensioning mechanism of claim 2 wherein said means for mounting said pulley for longitudinal movement comprises:
   a. a first bearing housing slidably mounted on said first side rail, adjacent one end thereof;
   b. a second bearing housing slidably mounted on said second side rail, adjacent one end thereof; and
   c. said pulley being rotatably mounted in said first and second bearing housings.

4. The conveyor belt tensioning mechanism of claim 3 wherein said adjustment means comprises:
   a. a first adjustment means on said first side rail for moving said first bearing housing longitudinally in a direction to cause said pulley to increase the tension force along a first longitudinal edge of said conveyor belt;
   b. a second adjustment means on said second side rail for moving said second bearing housing longitudinally in a direction to cause said pulley to increase the tension force along a second longitudinal edge of said conveyor belt;

c. a first indicating means on said first adjustment means, for indicating when tension force along said first longitudinal edge of said conveyor belt is within a preselected tension force range; and d. a second indicating means on said second adjustment means, for indicating when tension force along said second longitudinal edge of said conveyor belt is within a preselected tension force range.

5. The conveyor belt tensioning mechanism of claim 4 wherein said first adjustment means comprises:

a. a threaded shaft having a first end fastened to said first bearing housing and a second end extending longitudinally outwardly beyond an end flange member on said first side rail member;

b. said first indicating means having an elastically expandable and contractible body portion telescoped on said shaft for elastic expansion and contraction movement therealong, with a first end contacting said end flange member; and c. an end nut adjustably threaded onto said second end of said shaft, said end nut contacting a second end of said body portion to telescopically contract said first indicating means as said end nut is threaded onto said shaft, to thereby apply tension force to said conveyor belt.

6. The conveyor belt tensioning mechanism of claim 5 wherein said second adjustment means comprises:

a. a threaded shaft having a first end fastened to said second bearing housing and a second end extending longitudinally outwardly beyond an end flange member on said second side rail member;

b. said second indicating means having an elastically expandable and contractible body portion telescoped on said shaft for elastic expansion and contraction movement therealong, with a first end contacting said end flange member; and c. an end nut adjustably threaded onto said second end of said shaft, said end nut contacting a second end of said body portion to telescopically contract said second indicating means as said end nut is threaded onto said shaft, to thereby apply tension force to said conveyor belt.

7. The conveyor belt tensioning mechanism of claim 6 wherein said first and second indicating means each comprises:

a. a first hollow, tubular base member having an internal surface forming a longitudinal bore therein, said base member telescoped on said shaft, said base member having a first end contacting said flange member and terminating at a second end thereof;

b. a second hollow, tubular top member, having an internal surface forming a longitudinal bore therein, said top member being movably telescoped within said base member bore, said top member telescoped on said shaft and having an outer end contacting said end nut and terminating at an inner end;

c. a circumferential groove in an outer surface of said top member, said groove positioned intermediate between said outer and inner end of said top member, said groove having a preselected width extending longitudinally parallel to said longitudinal axis; and d. elastic spring means telescoped on said shaft and positioned within said bore of said base member and said top member, for elastically positioning said second end of said base member to a longitudinal position overlapping said groove, and for moving said top member longitudinally with respect to said base member, as said end nut is adjusted along the length of said shaft, whereby longitudinal tension force is exerted on said conveyor belt, and the amount of tension force so exerted is maintained within a preselected amount when the longitudinal position of said second end overlaps said groove.

* * * * *